United States Patent
Lang et al.

(10) Patent No.: US 7,386,728 B1
(45) Date of Patent: Jun. 10, 2008

(54) SECURITY MODULE AND METHOD FOR PRODUCTION OF FORGE-PROOF DOCUMENTS

(75) Inventors: Jurgen Lang, Bergisch-Gladbach (DE); Bernd Meyer, Konigswinter (DE)

(73) Assignee: Deutsche Post AG (DE)

( * ) Notice: Subject to any disclaimer, the term of this patent is extended or adjusted under 35 U.S.C. 154(b) by 768 days.

(21) Appl. No.: 10/089,990

(22) PCT Filed: Oct. 5, 2000

(86) PCT No.: PCT/DE00/03506

§ 371 (c)(1),
(2), (4) Date: Aug. 28, 2002

(87) PCT Pub. No.: WO01/25879

PCT Pub. Date: Apr. 12, 2001

(30) Foreign Application Priority Data

Oct. 7, 1999 (DE) .............................. 199 48 319
Apr. 27, 2000 (DE) .............................. 100 20 561

(51) Int. Cl.
*H04L 9/00* (2006.01)
*G06F 7/04* (2006.01)
*H04L 9/32* (2006.01)
*H04L 29/06* (2006.01)
*G06F 1/00* (2006.01)
*G07B 17/02* (2006.01)

(52) U.S. Cl. .................... 713/176; 726/26; 380/277

(58) Field of Classification Search ............... 713/176, 713/187, 193; 726/26; 380/277, 280
See application file for complete search history.

(56) References Cited

U.S. PATENT DOCUMENTS 5,150,409 A * 9/1992 Elsner ..................... 713/177
5,537,475 A * 7/1996 Micali ..................... 380/277
2002/0076044 A1* 6/2002 Pires ........................ 380/37

FOREIGN PATENT DOCUMENTS

DE 4442357 6/1996

(Continued)

OTHER PUBLICATIONS

Baozheng Yu, Congwei, Xu; "Forgery Attack on a Signature Scheme with Message Recovery", Aug. 2006, APCC Asia Pacific Conference on Communications, pp. 1-3.*

(Continued)

*Primary Examiner*—Emmanuel L Moise
*Assistant Examiner*—Courtney D Fields
(74) *Attorney, Agent, or Firm*—Connolly Bove Lodge & Hutz LLP

(57) ABSTRACT

The invention relates to a security module characterized in that said module contains a data input port via which information can be inputted into the security module. The security module has at least two data output ports whereby data can be outputted via a first data output port and transferred to an authentication unit and whereby data can be outputted via a second data output port. Said data can be transferred to a document to be exported. Said security module has at least two combination machines. A first combination machine generates a first result value for a first data output and a second combination machine generates a result value for the second data output. The invention relates to the use of a security module for generating forge-proof documents.

11 Claims, 1 Drawing Sheet

FOREIGN PATENT DOCUMENTS

| | | | |
|---|---|---|---|
| DE | 10043310 A1 | * | 3/2001 |
| EP | 0331352 | | 9/1989 |
| EP | 0722151 | | 7/1996 |
| EP | 0886409 | | 12/1998 |

OTHER PUBLICATIONS

Akl, S. G., "Digital Signatures: A Tutorial Survey," *IEEE Computer Society* 16:15-24, XP-000946230 Feb. 1983.

*Information Based Indicia Program Postal Security Device Specification*, USPS Engineering Center:i-A-l, XP-002137734 Jun. 13, 1996.

Hühnlein, D. et al, "Secure and Cost Efficient Electronic Stamps," Secunet Security Networks AG, XP-002185463 1999 (Lecture Notes in Computer Science vol. 1740, pp. 94-100).

* cited by examiner

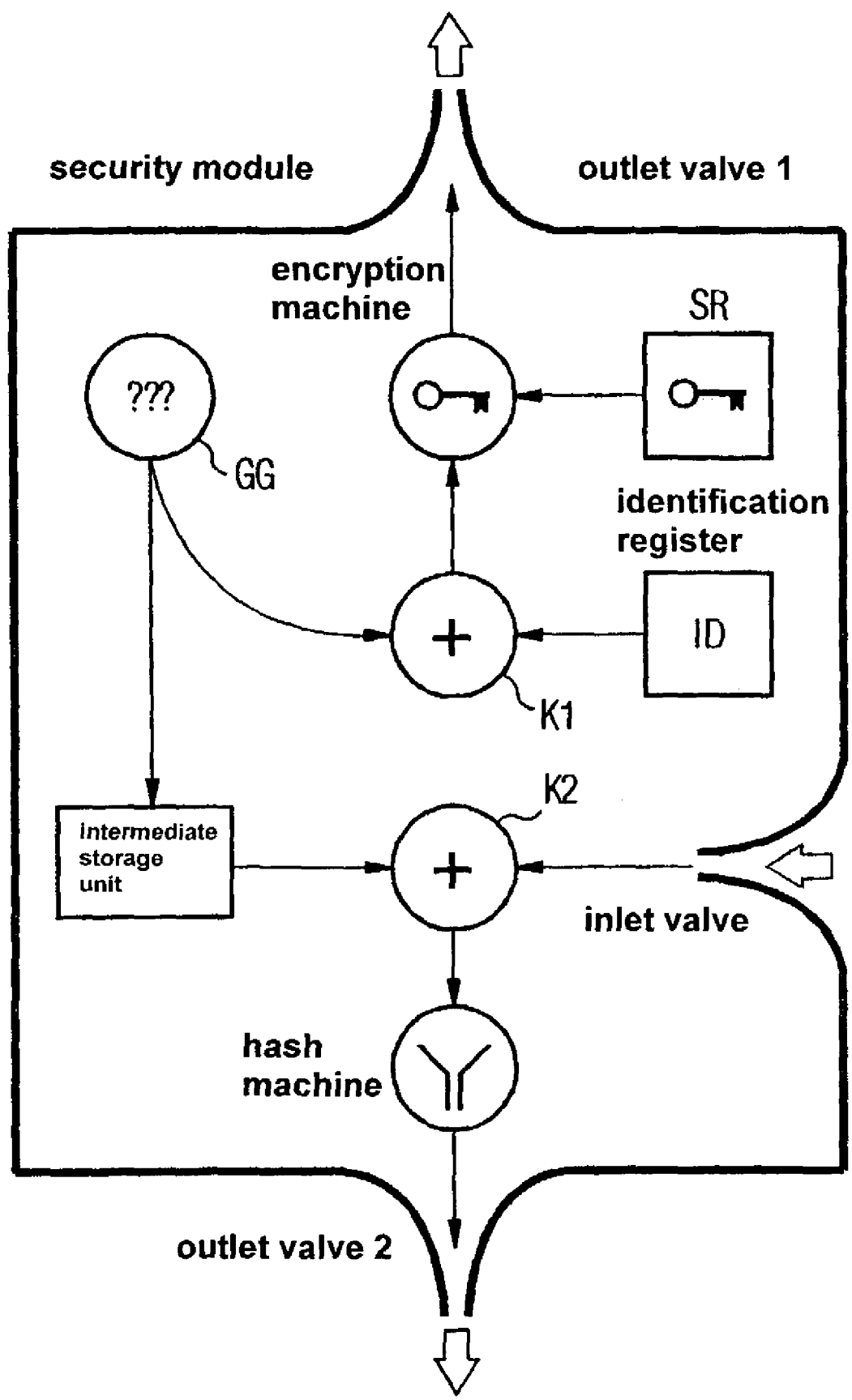

SECURITY MODULE AND METHOD FOR PRODUCTION OF FORGE-PROOF DOCUMENTS

The invention relates to a security module.

The invention also relates to a method for producing forgery-proof documents, whereby input data is input into a data input port of a security module.

The invention has the objective of creating a security module by means of which forgery-proof documents can be generated.

This objective is achieved according to the invention in that a security module is configured in such a way that it has a data input port via which information can be input into the security module, in that the security module has at least two data output ports, whereby data can be output via a first data output port and then transferred to an authentication unit and whereby data can be output via a second data output port and then be transferred to a document to be issued, in that the security module has at least two combination machines, whereby a first combination machine generates a result value for the first data output port and whereby a second combination machine generates a result value for the second data output port.

In order to enhance the security of the data, it is advantageous for the security module to be configured in such a way that it has a secret generator that generates an unpredictable secret.

In this context, it is particularly advantageous for the secret generator to be connected to the first combination machine and/or to the second combination machine in such a way that a secret generated by the secret generator is introduced into the first combination machine and/or into the second combination machine.

When the security module is used in systems that effectuate payments, especially payments for services, it is particularly practical for the security module to be configured in such a way that it has an identification register, whereby an output value of the identification register is connected to the first combination machine in such a manner that a value of the identification register is introduced into a data combination issued by the first combination machine.

The security of the data can be advantageously further enhanced in that the security module has at least one encryption machine that encrypts an output value of one of the combination machines.

Here, it is practical for the encryption machine to be connected to a key register, whereby at least one value contained in the key register can be used in the encryption machine for encryption purposes.

An advantageous implementation of the security module is characterized in that it has a hash machine.

Further advantages, special features and practical refinements of the invention can be gleaned from the subordinate claims and from the following presentation of preferred embodiments with reference to the drawing.

The drawing, FIG. 1, shows a schematic diagram of a security module suitable for producing forgery-proof documents.

The security module shown in FIG. 1 has a data input port via which information can be input into the security module.

The security module also has two data output ports DA1 and DA2.

The first data output port DA1 can output data that is transferred to an external unit, for instance, an authentication unit.

The second data output port DA2 can transmit data to a document that is going to be issued.

The security module also has at least two combination machines K1, K2. The first combination machine K1 generates a result value for the first data output port DA1. The second combination machine K2 generates a result value for the second data output port DA2.

Furthermore, the security module has at least one secret generator GG that generates an unpredictable secret. The secret generator is connected to the first combination machine K1 as well as to the second combination machine K2. The secret generator GG and the combination machine K2 are preferably connected by means of an intermediate memory unit.

The intermediate memory unit preferably serves the function of temporarily storing the secret generated by the secret generator.

The security module also has an identification register that is connected to the first combination machine K1 in such a way that a value of the identification register is introduced into a data combination that is output by the first combination machine.

An encryption machine contained in the security module is programmed in such a way that it encrypts an output value of one of the combination machines, namely, combination machine K1 in the case described here.

In order to save memory space, it is practical to use an asymmetrical key pair based on a suitable security standard such as, for example, RSA, for purposes of the encryption and the signature. Since no random texts predefined by the user can be introduced into the encryption, signature and hash value formation, this step is warranted.

The key length is preferably at least 128 bits, advantageously much more, for instance, at least 1024 bits, RSA.

The hash value is preferably generated according to standard SHA-1. The hash machine irreversibly links introduced data to a secret. As a result, when the same data is linked again in the same manner, an identical result is obtained without allowing any conclusions about the secret. Preferably, the secret is temporary since this improves the level of security. This, however, is not necessary. For instance, the secret can be permanently stored into a data memory unit.

The operating principle of the security module will be explained below with reference to the especially preferred example of the franking of mailed letters.

However, the security module is likewise suitable for other encryption purposes. The use of the security module for producing forgery-proof documents is particularly advantageous. The expression "forgery-proof document" should be understood in its broadest sense. In addition to the franking described as examples, the forgery-proof documents can also be transportation tickets or entrance tickets. The capability to generate every single document on the basis of individual data also allows the creation of unique documents such as personal identity cards, seat tickets or lists containing personalized values.

The security module preferably processes information that can be individualized such as, for example, certificates and digitally signed licenses.

In a preferred example of an application for the franking of letters at Deutsche Post AG, this is done as follows:

A digital signature is a digital data seal that is generated with a private signature key and that uses an associated public key, which is provided with a signature key certificate, to recognize the owner of the signature key and the integrity of the data (see Article 2, Clause 1 of SigG—

German Signature Law). Using the terminology employed there, a checking unit is able to examine the digital signature of a document producer and thus also its identity, as well as the integrity of the data contained in the document if the checking unit knows the public signature key of the document producer that is provided with a signature key certificate.

Every security module produced is "digitally licensed" by the client system producer. In order to communicate with the security modules, the authentication unit creates its own signed communication license in the same format.

The certification and the signed licensing preferably take place as follows:

The security module internally generates a key pair whose public key $P_{SB}$ is digitally licensed using the private signature key of the client system issuer $S_I$ (issuer). Like the public key of the authentication unit, the public key of the client system issuer $P_I$ is generated and certified by the certification unit (CA), where it is available for checking.

Altogether, the following keys, certificates and signed licenses are used in the system.

The security module contains a private key of the security module, a public key of the security module and a license of the public key of the security module signed by the client system issuer.

Preferably, at least one private key of the authentication unit and one public key of the authentication unit are available to the authentication unit.

The security module checks the validity of the signed license, for example, by contacting a certification unit.

The authentication unit checks the validity of the signed license of a security module—and thus the identity of the client system issuer via the identity of the natural person who is responsible for the client system issuer according to the attribute entry in the certificate—by contacting the certification unit.

The issuer of the signature cards ensures that the appertaining attributes (for instance, legal authorization to issue licenses for security modules) are exclusively issued in coordination with the unit to which the forgery-proof documents are submitted.

A regular replacement of the key pair of the security module is not necessary although it is possible. The envisaged duration of validity of the key should be as long as possible in order to increase the user-friendliness. Preferably, the key of the security module is valid for several months or years, whereby values between 3 months and 15 years are options. Preferably, the duration of validity lies between 3 and 10 years, 6 years being particularly suitable.

At any time, the client system producer is authorized to change the keys with which it digitally licenses the licenses of the issued security modules. At the latest after one year, the client system producer is obliged to change the signature key with which it digitally signs the licenses of the issued security modules and concurrently to block the old signature key. The client system producer identifies the signature key in coordination with the authentication unit.

A unit authorized to check the forgery-proof documents rejects transactions when a corruption of a key is noted. When the security module is employed to produce forgery-proof postage stamps, the unit authorized to check the documents is the postal service operator, for example, Deutsche Post AG. In this case, a corruption of a key of a client system issuer results in an immediate rejection on the part of the postal system of any transactions with security modules of the client system producer whose signed licenses have been produced with this key.

The administration of the keys of the certification unit is done in accordance with the applicable statutory and legal administrative stipulations. In Germany, these are the German Signature Law (SigG) and the German Signature Regulations (SigV). The security can be further improved by incorporating internal processing stipulations.

The keys of the authentication unit can be changed at any time without the need for changes to be made in the client systems.

An authentication process will be described below with reference to the use of symmetrical keys of the authentication unit.

Symmetrical keys allow very fast encrypting and decrypting. The use of symmetrical keys presupposes that the key of the sender matches the key of the recipient. In the case of communication between the authentication unit and numerous client systems, symmetrical keys can be employed if the authentication unit has sufficient memory capacity for the individual keys that match the appertaining client systems.

The use of asymmetrical keys, in contrast, means that the sender encrypts the communication with the public key of the recipient and that the recipient decrypts the communication with its private key.

Depending on the area of application, either symmetrical or asymmetrical keys should be employed. The methods described, however, can fundamentally function with symmetrical keys as well as with asymmetrical keys.

Security Tasks of the Security Module

For purposes of initialization, communication with the authentication unit and deactivation, the security module essentially has to perform the following tasks:

Key Generation

Generation and storage of an asymmetrical key pair within the security module.

Issuing the Public Key

Issuing the generated public key within the scope of the digital signature of the license by the client system issuer. The private key must never leave the security module.

Certificate Storage

Permanent storage of one's own public key or of one's own signed license within the scope of the initialization.

Signature Generation

Generation of a digital signature employing one's own private signature key.

Signature Check

Checking the digital signature of an authentication module of the authentication unit using the signed license of the authentication unit and its certificate according to a suitable security standard such as, for instance, SigG.

Certificate Check

Checking a certificate through an inquiry to the certification unit.

Temporary Certificate Storage

Temporary storage of a certificate or of a signed license within the scope of a communication session.

Asymmetrical Encryption

Encryption of data with a verified public key of a communication partner.

Asymmetrical Decryption

Decryption of data with one's own private key, the data having been encrypted with one's own public key.

Random Number Generation

Generation and permanent storage of a demonstrably high-quality random number within a numerical space of at least 16 bytes.

Storage of a Session Key

Temporary storage of a session key having a length of 16 bytes.

Storage of Two Identification Numbers of the Loading Operation

Storage of each of the two most recent identification numbers having a length of 16 bytes each.

Storage of the Current Register Value of the Currency Depot

Storage of the currency and of the sum that can currently be used to produce postage stamps; "descending register".

Storage of the Ascending Register Value

Storage of all of the sums that have been spent for franking with the security module, preferably in a single currency, for example, the euro; "ascending register".

User Identification

Personal identification of the security module user who is authorized for certain utilization options by using a PIN to be encrypted with the user's own public key.

Status Output of the Identification Number of the Loading Operation

Output of the validity of the current loading system to the client system without the possibility of changes by the client system.

Status Output of the Register Value of the Currency Depot

Output of the currently available depot value to the client system without the possibility of changes by the basic system.

Hash Formation of the Transmission-Specific Data

Formation of a hash value, for example, according to SHA-1 of the transmission-specific data transmitted by the client system and of the stored random number.

Reduction of Register Values of a Currency Depot

Preferably, the security module works together with a digital currency depot. This currency depot can be integrated into the security module or else be accommodated separately. A separate accommodation is effectuated, for example, in a digital wallet.

The storage operation ensures that only actually available sums will be used. During the utilization, where, for instance, a hash value is formed, the sum and thus also the register value associated with it are reduced.

Digital Signature of the Transmission-Specific Data

Formation and issuing of the digital signature of the transmission-specific data for each hash formation of the transmission-specific data.

Error Log

Logging the activity of valid as well as invalid communication attempts with the security module.

Self-Test

Carrying out a self-test during each activation.

Deactivation

Deactivation of the security module after identification and request by an operator.

Security Level According to FIPS PUB 140

The objective of the security module is to ensure the confidentiality and integrity of information that is stored and processed in the security module within a client system. In order to attain a uniform security level with different client systems and different security modules, the correspondence with and certification according to a pre-specified security level, for example, according to a security level defined by FIPS PUB 140 (FIPS PUB 140: "Security Level") is advantageous.

The use of FIPS PUB 140, Security Level 4, is particularly advantageous.

The security level recommended for the execution is FIPS PUB 140, Security Level 3 because it combines a high degree of data security with simple handling.

It is particularly advantageous for the system to fulfill requirements that exceed FIPS PUB 140-1.

In order to further enhance the security of the data, it is advantageous to carry out the safety-relevant processes of the client system as follows:

The security module is produced and initialized in a secure environment in accordance with the security standard coordinated with Deutsche Post AG. The risk of corruption of the signature key employed to create the signed licenses of the produced security module is minimized by inspections. In the production process, a key pair is generated, a public key for generating the signed license by the client system issuer is created, a signed license of the security module (including the security module ID) is stored in the security module and the attribute entry is stored in an employed certificate.

Activation of the Security Module by the Client System

In order to activate the security module from the client system, the security module is requested to submit its signed license (including its public key $P_{SB}$) as well as a random number $X_{auth}$ having a length of 16 bytes to the client system. (The random number especially serves to safeguard against replay attacks whenever there is an unsecured transmission value between the keyboard of the client system and the security module, for instance, in the case of Internet solutions involving a central security module server on the Internet and decentralized PCs as input terminals for login information such as, for example, the PIN.)

Handling of Errors

If the signed license and random number are requested several times, for instance, three times in a row, without login data being subsequently transmitted from the client system to the security module, this has to be logged in the security module. In this mode, all that is permissible is a subsequent connection with the authentication unit for error correction with a transmission of the log status, but not the production of forgery-proof documents such as entrance tickets or postage stamps.

After the authentication of the client system or client, the security module reads the current identification number of the loading operation, the preceding identification number, the current value sum and the validity of the value and transmits these to the basic system. There can be no change to these values by this user (FIPS PUB 140: role) in this user utilization possibility (FIPS PUB 140: service).

The invention claimed is:

1. A security module suitable for use with a digital currency depot for producing a forgery-proof document, the module comprising:

an identification register, a key register and a secret generator that generates an unpredictable secret;

a first combination machine arranged to combine an output value of the identification register and an output value of the secret generator;

an encryption machine arranged to encrypt an output value of the first combination machine to an authentication unit via a first outlet valve;

a second combination machine that combines the unpredictable secret and input data received via an inlet valve;

a hash machine that generates and outputs an irreversible hash value responsive to an output of the second combination machine; and means for ensuring that the forgery-proof document is produced only if actual sums of money are available to the digital currency depot.

2. The security module of claim 1, further comprising a key register coupled to the encryption machine, wherein at least one value stored in the key register is used by the encryption machine to provide the encrypted output of the first combination machine.

3. A method for producing a forgery-proof document, the method comprising:

generating an unpredictable secret using a secret generator;

combining an output value of the identification register and an output value of the secret generator using a first combination machine;

encrypting an output value of the first combination machine, using an encryption machine, to an authentication unit via a first outlet valve;

combining the unpredictable secret and input data received via an inlet valve using a second combination machine;

generating and outputting an irreversible hash value, using a hash machine, in response to an output of the second combination machine;

ensuring that the forgery-proof document is produced only if actual sums of money are available to a digital currency depot;

providing the output of the second combination machine as forgery-proof information to the forgery-proof document; and issuing the forgery-proof document.

4. A method for producing a forgery-proof document, the method comprising:

generating an unpredictable secret;

combining an output of an identification register and the unpredictable secret;

encrypting the combined output of the identification register and the unpredictable secret;

outputting the encrypted combined output to an authentication unit;

combining the secret and the input data input via an inlet valve;

using the combined secret and input data to form an irreversible hash value;

interfacing with a digital currency depot; and ensuring that only sums of money actually available to the digital currency depot are used to produce the forgery-proof document.

5. The method of claim 4, wherein said outputting comprises outputting the irreversible hash value to the forgery-proof document as forgery-proof information.

6. The security module of claim 1, wherein the irreversible hash value is output as forgery-proof information to the forgery-proof document.

7. The security module of claim 1, further comprising means for reducing a register value associated with a particular currency sum available to the digital currency depot in response to production of the forgery-proof document.

8. A system for effectuating payments for services involving forgery-proof documents, the system comprising:

a digital currency depot;

a security module operatively connected to the digital currency depot for producing the forgery-proof documents, wherein the security module comprises:

an identification register, a key register and a secret generator that generates an unpredictable secret;

a first combination machine arranged to combine an output value of the identification register and an output value of the secret generator;

an encryption machine arranged to encrypt an output value of the first combination machine to an authentication unit via a first outlet valve;

a second combination machine that combines the unpredictable secret and input data received via an inlet valve;

a hash machine that generates and outputs an irreversible hash value responsive to an output of the second combination machine; and means for ensuring that a forgery-proof document is produced only if actual sums of money are available for use by the digital currency depot.

9. The system of claim 8, wherein the forgery proof document is produced as a postage stamp.

10. The system of claim 8, wherein the security module further comprises a storage device that stores information relating to a currency and a sum that can currently be used to produce the forgery proof document.

11. The system of claim 8, wherein the security module further comprises a storage device that stores information relating to a currency and a total sum that has been expended to produce forgery proof documents.

* * * * *